UNITED STATES PATENT OFFICE.

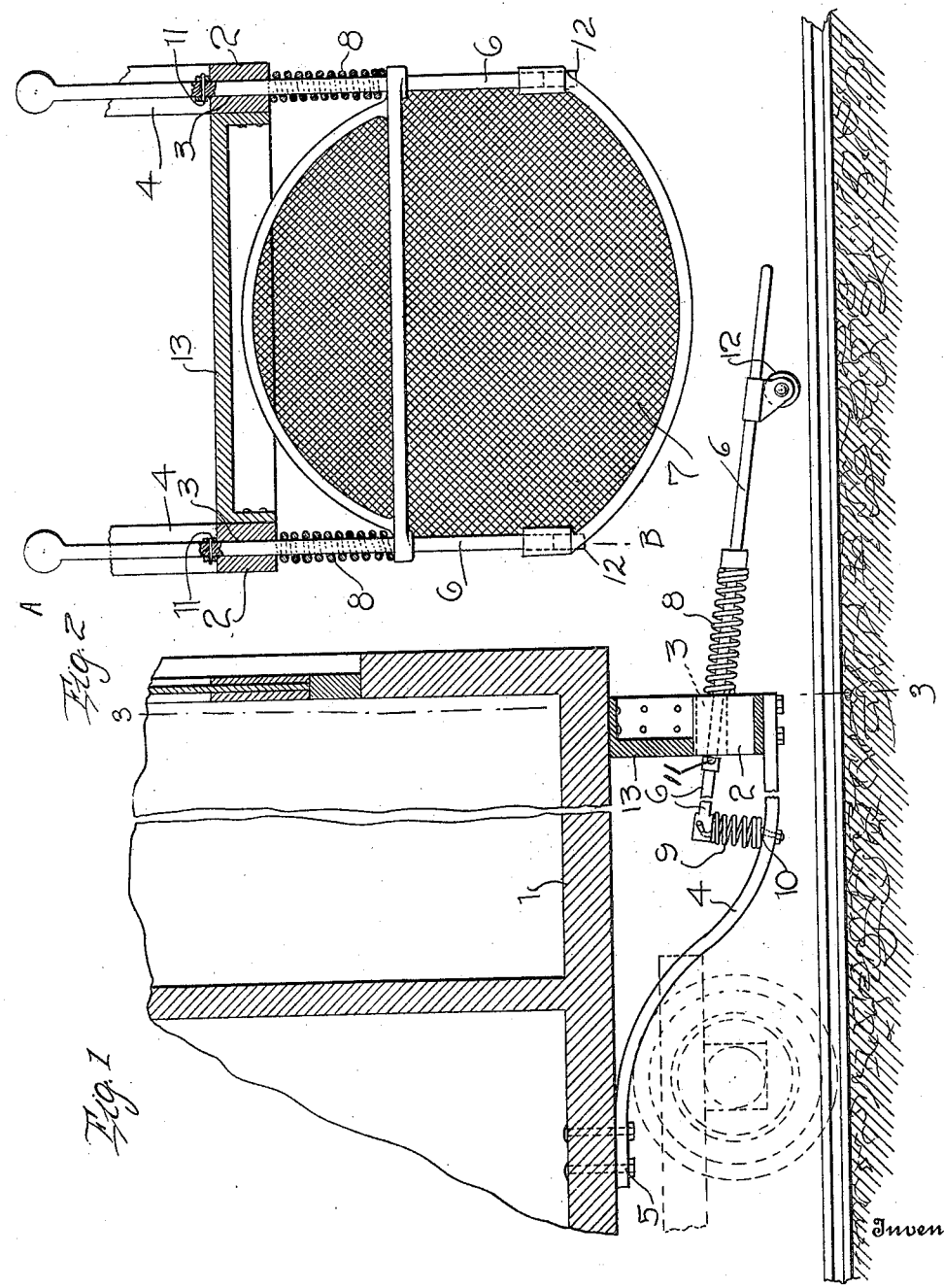

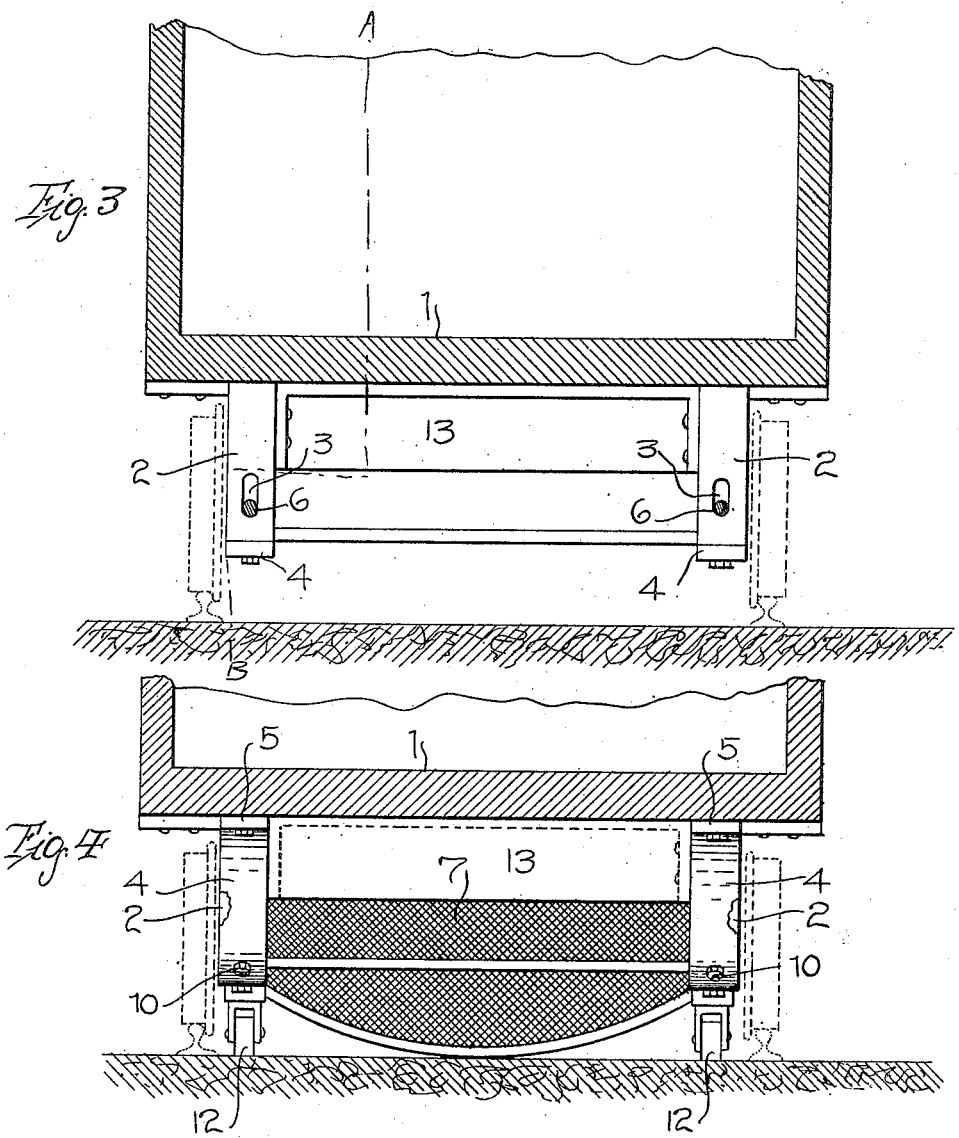

JOSEPH L. McDONNELL, OF PHILADELPHIA, PENNSYLVANIA.

CAR-FENDER.

1,104,435.

Specification of Letters Patent.  Patented July 21, 1914.

Application filed April 9, 1913. Serial No. 760,020.

*To all whom it may concern:*

Be it known that I, JOSEPH L. McDONNELL, a citizen of the United States, residing at Philadelphia, in the county of Philadelphia and State of Pennsylvania, have invented certain new and useful Improvements in Car-Fenders, of which the following is a specification, reference being had to the accompanying drawings.

This invention relates to new and useful improvements in fenders and more particularly to a street car fender, the object of the invention being to provide a car fender which will prevent the car from passing over persons who come in the path of the car, and who are unable to remove themselves from the path of said car, from lack of time, and who would otherwise be struck by the car and the car pass over them.

Another object of my invention is to provide a car fender of the above character which will possess advantages in points of efficiency and durability, is inexpensive of manufacture and at the same time is simple in construction and operation.

With the above and other objects in view, this invention consists in the novel features of construction and the combination and arrangement of parts hereinafter more fully described, pointed out in the claim and shown in the accompanying drawings, in which—

Figure 1 is a vertical sectional view taken on substantially the line A—B of Figs. 2 and 3. Fig. 2 is a top plan view, parts being broken away and in section; Fig. 3 is a transverse sectional view taken on the line 3—3 of Fig. 1. Fig. 4 is a rear elevation.

Referring more particularly to the drawings, 1 indicates the front platform of a street car of any well known construction and suspended therefrom are the supporting bars 2, having formed in the lower ends thereof, the elongated openings 3. The lower ends of the supporting members 2 are securely held in position by means of the curved brace members 4, the rear ends of which are rigidly secured to the bottom of the car, as shown at 5, and the forward ends thereof secured to the lower ends of the supporting member 2. Slidably moutned within the elongated openings 3 are the ends of the fender rod 6, to the intermediate portion of which is secured the fender apron 7. Mounted upon the rod 6 and arranged between the supporting members 2 and the fender apron 7 are the coil springs 8, which are adapted to absorb any shock or jar resulting from an object coming in contact with the fender apron 7.

The inner ends of the supporting rod 6 are secured to the upper ends of the coil springs 9, said coil springs having their lower ends resting upon and rigidly secured to the curved brace members 4, as shown at 10. The springs 9 tend to balance the fender and normally hold the same in spaced relation with the ground so that the forward end of the fender will not come into engagement with a rigid object along the track. The fender apron 7 is held against forward longitudinal movement by means of the pins 11, said pins being suitably mounted upon the side rods 6 and adapted to engage the rear side of the supporting members 2 to limit the forward movement of the fender. Secured to the forward end of the fender upon each side thereof are the wheels 12, which are adapted to engage the track when the fender drops after coming into engagement with an object, thus eliminating the jolting of the person or object which has been received within the fender.

The supporting members 2 are suitably connected by means of a guard 13 arranged across the car at the rear of the fender and which is adapted to prevent the person or object from passing back beneath the wheels of the car. This guard may be of any well known form and secured to the supporting members in any suitable manner. From the above, it will be apparent that the shock occurring from an object striking against the fender apron 7 will be eliminated by the tension of the springs 8. It will also be apparent that when the object has been removed from the fender apron 7, the same will be returned to its normal position by the tension of the springs 9. It will also be apparent that I have provided a simple and durable guard fender, which may be quickly and readily attached or removed from the car and which at the same time will prevent the car from passing over persons who come within the path of the car. The device in itself is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

A car fender including vertically disposed spaced supports having elongated openings in the lower ends thereof, curved brace members having their outer ends arranged in a plane lower than the inner ends and secured to the lower ends of said supports, the inner ends of said brace members being rigidly secured to the car bottom at a point to the rear of the supports, a fender rod having its ends movably supported in said elongated openings, a fender apron supported by the intermediate portion of said rod, coil springs disposed between the inner ends of said rod and said brace members to normally hold the fender apron in spaced relation with the ground, a second set of coil springs mounted upon the ends of the fender rod and disposed between the fender apron and the supports, and transverse pins carried by said rod and adapted to engage the rear side of said supports to limit the outward sliding movement of the fender apron.

In testimony whereof I hereunto affix my signature in the presence of two witnesses.

JOSEPH L. McDONNELL.

Witnesses:
 Jos. G. Denny, Jr.,
 A. M. Kerhane.

Copies of this patent may be obtained for five cents each, by addressing the "Commissioner of Patents, Washington, D. C."